(12) United States Patent
Dhamdhere et al.

(10) Patent No.: US 9,104,750 B1
(45) Date of Patent: Aug. 11, 2015

(54) USING CONCEPTS AS CONTEXTS FOR QUERY TERM SUBSTITUTIONS

(71) Applicant: Google Inc., Mountain View, CA (US)

(72) Inventors: Kedar Dhamdhere, Sunnyvale, CA (US); Thomas Strohmann, Fremont, CA (US); P. Pandurang Nayak, Palo Alto, CA (US); Robert Spalek, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/650,322

(22) Filed: Oct. 12, 2012

Related U.S. Application Data (60) Provisional application No. 61/650,143, filed on May 22, 2012.

(51) Int. Cl.
*G06F 17/30* (2006.01)

(52) U.S. Cl.
CPC .................................. *G06F 17/3064* (2013.01)

(58) Field of Classification Search
CPC ............... G06F 17/30; G06F 17/3064; G06F 17/30666; G06F 17/30672; G06F 17/3097
USPC .......... 707/769, 770.771, 780, 767, 768, 765, 707/763, 759, 721, 708, 713, E17.017, 707/E17.062, E17.066, E17.131, E17.135, 707/771
See application file for complete search history.

(56) References Cited

U.S. PATENT DOCUMENTS

| | | | |
|---|---|---|---|
| 6,078,916 A | 6/2000 | Culliss | |
| 6,374,241 B1 | 4/2002 | Lamburt et al. | |
| 7,406,465 B2 | 7/2008 | Jones et al. | |
| 8,086,599 B1 | 12/2011 | Heymans | |
| 8,332,391 B1 | 12/2012 | Heymans | |
| 2004/0236736 A1 | 11/2004 | Whitman et al. | |
| 2005/0222998 A1 | 10/2005 | Driessen et al. | |
| 2006/0026152 A1 | 2/2006 | Zeng et al. | |
| 2006/0122991 A1* | 6/2006 | Chandrasekar et al. | 707/3 |
| 2007/0282809 A1* | 12/2007 | Hoeber et al. | 707/3 |
| 2008/0027913 A1 | 1/2008 | Chang et al. | |
| 2008/0091670 A1* | 4/2008 | Ismalon | 707/5 |
| 2008/0195601 A1 | 8/2008 | Ntoulas et al. | |
| 2011/0016106 A1 | 1/2011 | Xia | |
| 2014/0344263 A1* | 11/2014 | Dhamdhere et al. | 707/727 |

* cited by examiner

*Primary Examiner* — Thu-Nguyet Le
(74) *Attorney, Agent, or Firm* — Fish & Richardson P.C.

(57) ABSTRACT

Methods, systems, and apparatus, including computer programs encoded on a computer storage medium, for collecting query term substitution data based on one or more identified concepts. According to one implementation, a method includes receiving a query that includes at least three sequential query terms; determining that the sequential query terms represent a concept; and in response to determining that the sequential query terms represent a concept, collecting query term substitution data for one or more query terms that occur in queries that include the concept.

20 Claims, 5 Drawing Sheets

USING CONCEPTS AS CONTEXTS FOR QUERY TERM SUBSTITUTIONS

CLAIM OF PRIORITY

This application claims the benefit of U.S. Provisional Application Ser. No. 61/650,143, filed on May 22, 2012, the entire contents of which are hereby incorporated by reference.

BACKGROUND

This specification generally relates to search engines, and one particular implementation relates to evaluating substitute terms that are used in revising search queries.

SUMMARY

In general, one innovative aspect of the subject matter described in this specification can be implemented in methods that include the actions of receiving an initial search query, and identifying whether the initial search query includes at least one concept. If the initial search query includes at least one concept, usage data associated with subsequent search queries including the identified concept are collected to determine whether a substitute term exists for a search query term that is adjacent to the identified concept in the initial search query. In a similar off-line method, the initial search query may be a query that is selected from a query log.

A search system may determine a specific context within a search query based on the adjacency of query terms to a particular query term. Because the computation complexity increases with an increasing number of query terms used in determining a context, a search system traditionally limits the use of the number of query terms to one query term ("unigram") or two query terms ("bigram") in determining the context of a query. A concept is a grouping of sequential query terms, and can extend beyond three query terms ("trigram") or more ("n-gram"). A search system may treat a concept as one term in determining the context of a query, so more query terms may be considered without adding prohibitively large computation complexity to the search system.

According to another innovative aspect of the subject matter described in this specification, a method includes receiving a query that includes at least three sequential query terms, determining that the sequential query terms represent a concept, and in response to determining that the sequential query terms represent a concept, collecting query term substitution data for one or more query terms that occur in queries that include the concept.

Other implementations of this aspect include corresponding systems, apparatus, and computer programs, configured to perform the actions of the methods, encoded on computer storage devices.

These and other implementations can each optionally include one or more of the following features. For instance, the method includes collecting query term substitution data for one or more query terms that occur in the received query; the method includes collecting query term substitution data for one or more query terms that occur in subsequent queries that include the concept; the method includes the concept is adjacent to the one or more query terms in the subsequent queries; the method includes collecting query term substitution data for one or more query terms in a context of the concept; the method includes determining a substitution rule in a context of the concept based on the collected query term substitution data.

According to another innovative aspect of the subject matter described in this specification, a method includes receiving a query that includes a plurality of sequential query terms, determining, by one or more computers, that at least two sequential query terms in the plurality of sequential query terms represent a first concept, and at least one other query term in the plurality of sequential query terms represent a second concept, and in response to determining that at least two sequential query terms in the plurality of sequential query terms represent a first concept, and at least one other query term in the plurality of sequential query terms represent a second concept, collecting query term substitution data for one or more other query terms that occur in queries that include the first concept and the second concept.

These and other implementations can each optionally include one or more of the following features. For instance, the method includes collecting query term substitution data for one or more query terms that occur in the received query; the method includes collecting query term substitution data for one or more query terms that occur in subsequent queries that include the first concept and the second concept; the method includes the first concept and the second concept are each adjacent to opposite sides of the one or more query terms in the subsequent queries; the method includes the first concept is adjacent to the one or more query terms in the subsequent queries; the method includes the first concept is adjacent to the second concept, and the second concept is adjacent to the one or more query terms in the subsequent queries; the method includes collecting query term substitution data for one or more query terms in a context of the concept; the method includes determining a substitution rule in a context of the first concept and the second concept based on the collected query term substitution data.

Advantageous implementations may include one or more of the following features. To identify a context in a query, the search system traditionally can track only one or two words around a query term due to computation complexity. A concept can include more than two words. A substitute term rule in a specific context identified by a concept can be determined empirically from user interactions with search result data. By extending the formation of a context beyond two words, the search system can determine substitution rules directed to more specific contexts and potentially improve search results.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
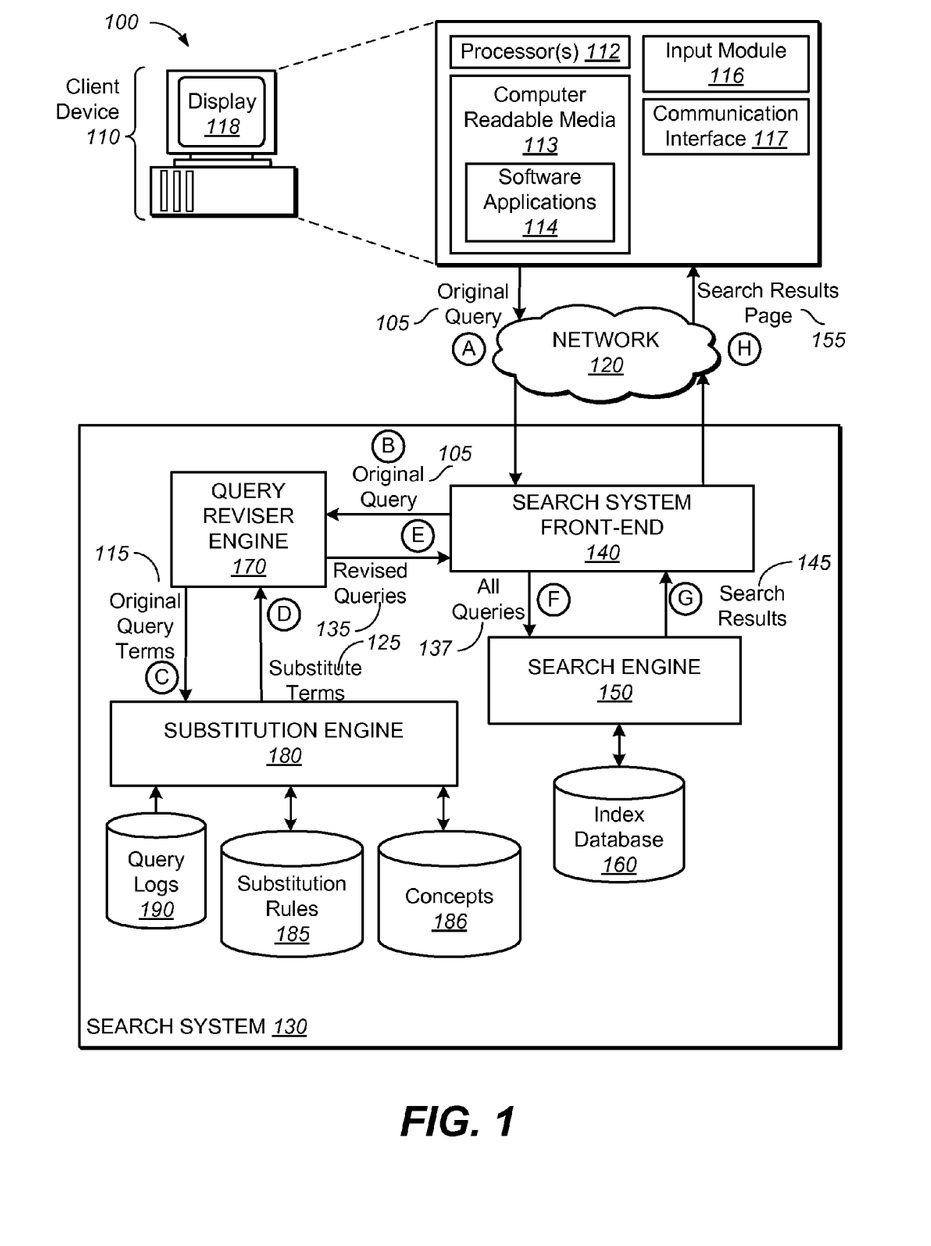
FIG. 1 is a block diagram illustrating an example system that can revise search queries using substitute terms.

FIG. 1 is a diagram of an example system 100 that can revise search queries using substitute terms. In general, the system 100 includes a client device 110 coupled to a search system 130 over a network 120. The search system 130 includes a search engine 150, a query reviser engine 170, and a substitution engine 180. The search system 130 receives a query 105, referred to by this specification as the "original query" or an "initial query," from the client device 110 over the network 120. The search system 130 provides a search results page 155, which presents search results 145 identified as being responsive to the query 105, to the client device 110 over the network 120.

In some implementations, the search results 145 identified by the search system 130 can include one or more search results that are identified as being responsive to queries that are different than the original query 105. The search system 130 can generate or obtain other queries in numerous ways (e.g., by revising the original query 105).

In some implementations, the search system 130 can generate a revised query by adding to the original query 105 additional terms that are substitute terms of one or more terms that occur in the original query 105. In other implementations, the search system 130 can generate a revised query by substituting terms that are substitute terms of terms that occur in the original query 105, in place of the terms in the original query 105. The substitution engine 180 can determine the additional terms that are candidate substitute terms for the one or more terms that occur in the original query. The query reviser engine 170 can generate the revised query. The search engine 150 can use the original query 105 and the revised queries to identify and rank search results. The search engine 150 can provide the identified search results 145 to the client device 110 on the search results page 155.

The substitution engine 180 can identify the substitute terms the query reviser engine 170 can use to generate revised queries by evaluating terms included in previously received queries stored in a query logs database 190. The queries stored in the query logs database 190 can include previous queries where a user considered the results of the queries desirable. The queries stored in the query logs database 190 can include previous queries determined by the search system 130 as providing desirable results.

For example, given a first term ("cat"), the substitution engine 180 can evaluate terms ("feline" or "banana") that are candidate substitute terms for the original term. In addition, the substitution engine 180 can determine that certain terms are substitute terms of the first term (as in the case of "feline"), and that other terms are not substitute terms of the first term (as in the case of "banana"). The substitution engine 180 can base this determination on rules stored in a substitution rules database 185. For example, a substitution rule can be "feline" is a substitute term for cat and "banana" is not a substitute term for cat.

In some implementations, a substitution rule can include multi-word original query terms to a single-word substitute term, or a single-word original query term to multi-word substitute terms. For example, a substitute rule can specify "SSN" as a substitute term for "Social Security Number". In another example, a substitute rule can specify "For Rent" as substitute terms for "Rental".

The search system 130 can define substitution rules to apply generally, or to apply only when particular conditions, or "query contexts," are satisfied. For example, the query context of a substitution rule can specify one or more other terms that should be present in the query for the substitution rule to apply. Furthermore, query contexts can specify relative locations for the other terms (e.g., to the right or left of a query term under evaluation). In another example, query contexts can specify a general location (e.g., anywhere in the query). For example, a particular substitution rule can specify that the term "pet" is a substitute term for the query term "dog," but only when the query term "dog" is followed by the term "food" in the query. Multiple distinct substitution rules can generate the same substitute term for a given query term. For example, for the query term "dog" in the query "dog food," the term "pet" can be specified as a substitute term for "dog" by both a substitution rule for "dog" in the general context and a substitution rule for "dog" when followed by "food."

In some implementations, the search system 130 can determine a query context associated with one or more terms in a query to be a concept, and store the concept in a concepts database 186. In some implementations, the search system 130 can combine two or more concepts to form a new query context.

The substitution rules can depend on query contexts that define other terms in the original query 105. In other words, a substitution rule need not apply in all situations. For example, when the term "cats" is used as a single-term query, the term "felines" can be considered a substitute term for "cats". The substitution engine 180 can return the term "felines" to the query reviser engine 170 to generate a revised search query. In another example, when the query includes the term "cats" followed by the term "musical," a substitution rule can specify that the term "felines" is not a substitute term for "cats." In some implementations, the substitution rules can be stored in the substitution rules database 185 for use by the substitution engine 180, the query reviser engine 170, or the search engine 150.

In the illustrative example of FIG. 1, the search system 130 can be implemented as computer programs running on one or more computers in one or more locations that are coupled to each other through a network (e.g., network 120). The search system 130 includes a search system front-end 140 (e.g., a "gateway server") that coordinates requests between other parts of the search system 130 and the client device 110. The search system 130 also includes one or more "engines": the search engine 150, a query reviser engine 170, and the substitution engine 180.

As used in this specification, an "engine" (or "software engine") refers to a software implemented input/output system that provides an output that is different from the input. An engine can be an encoded block of functionality, such as a library, a platform, a Software Development Kit ("SDK"), or an object. The network 120 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The search system front-end 140, the search engine 150, the query reviser engine 170, and the substitution engine 180 can be implemented on any appropriate type of computing device (e.g., servers, mobile phones, tablet computers, notebook computers, music players, e-book readers, laptop or desktop computers, PDAs, smart phones, or other stationary or portable devices) that includes one or more processors and computer readable media. Among other components, the client device 110 includes one or more processors 112, computer readable media 113 that store software applications 114 (e.g., a browser or layout engine), an input module 116 (e.g., a keyboard or mouse), a communication interface 117, and a display device 118. The computing device or devices that implement the search system front-end 140, the query reviser engine 170, and the search engine 150 may include similar or different components.

In general, the search system front-end 140 receives the original query 105 from the client device 110. The search system front-end 140 routes the original query 105 to the appropriate engines included in the search system 130 so that the search system 130 can generate the search results page 155. In some implementations, routing occurs by referencing static routing tables. In other implementations, routing occurs based on the current network load of an engine, in order to accomplish load balancing. In addition, the search system front-end 140 can provide the resulting search results page 155 to the client device 110. In doing so, the search system front-end 140 acts as a gateway, or interface, between the client device 110 and the search engine 150.

Two or more of a search system front-end, a query reviser engine and a search engine (e.g., the search system front-end 140, the query reviser engine 170, and the search engine 150, respectively) may be implemented on the same computing device, or on different computing devices. Because the search system 130 generates the search results page 155 based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted query 105.

In some implementations, the search system 130 can include many computing devices for implementing the functionality of the search system 130. The search system 130 can process the received queries and generate the search results by executing software on the computing devices in order to perform the functions of the search system 130.

Referring to FIG. 1, during state (A), a user of the client device 110 enters original query terms 115 for the original query 105, and the client device 110 communicates the original query 105 to the search system 130 over the network 120. For example, the user can submit the original query 105 by initiating a search dialogue on the client device 110, speaking or typing the original query terms 115 of the original query 105, and then pressing a search initiation button or control on the client device 110. The client device 110 formulates the original query 105 (e.g., by specifying search parameters). The client device 110 transmits the original query 105 over the network 120 to the search system 130.

Although this specification refers to the query 105 as an "original" or an "initial" query, such reference is merely intended to distinguish this query from other queries, such as the revised queries that are described below. The designation of the original query 105 as "original" is not intended to require the original query 105 to be the first query that is entered by the user, or to be a query that is manually entered. For example, the original query 105 can be the second or subsequent query entered by the user. In another example, the original query 105 can be automatically derived (e.g., by the query reviser engine 170). In another example, the original query 105 can be modified based on prior queries entered by the user, location information, and the like.

During state (B), the search system front-end 140 receives the original query 105 and communicates the original query 105 to the query reviser engine 170. The query reviser engine 170 can generate one or more revised queries 135 based on the substance of the original query 105. In some implementations, the query reviser engine 170 generates a revised query by adding terms to the original query 105 using substitute terms 125 for terms in the original query 105. In other implementations, the query reviser engine 170 generates a revised query by substituting the substitute terms 125 for the corresponding terms of the original query 105. The query reviser engine 170 can obtain substitute terms 125 for use in revising the original query 105 from the substitution engine 180.

During state (C), the query reviser engine 170 communicates original query terms 115 of the original query 105 to the substitution engine 180. The substitution engine 180 can use substitution rules included in the substitution rules database 185 to determine one or more substitute terms 125 for one or more of the original query terms 115 of the original query 105.

The substitution engine 180 communicates substitute terms 125 to the query reviser engine 170 during state (D). The query reviser engine 170 generates one or more revised queries 135 by adding substitute terms 125 to the original query 105. The query reviser engine 170 can also add logical operators (e.g. "OR") between substitute terms 125 and the corresponding original query terms. In addition, the query reviser engine 170 can generate one or more revised queries 135 by substituting certain terms of the original query 105.

In some implementations, the query reviser engine 170 can mark each of the substitute terms 125 with a confidence score in the one or more revised queries 135. The confidence score associated with a substitute term may be stored at the substitution rule database 185 or another database not shown here in the search system 130. In some implementations, the substitution engine 180 may determine the confidence score for a substitute term from previous user interactions with the substitute term in the context of the original query 105. As one example, the determination of the confidence score for a substitute term may be based partly on whether a user has selected a particular search result generated by the revised query which includes the substitute term, where the particular search result is not included in the search results generated by the original query. As another example, the confidence score for a substitute term may be based partly on whether a user has skipped a particular search result generated by a revised query which includes the substitute term, where the particular search result is not included in the search results generated by the original query, and the particular search result is ranked higher than the selected search result among the search results returned to the user. In some other implementations, the substitution engine 180 may determine the confidence score of a substitute term from the search results generated by the original query 105. As one example, the confidence score for a substitute term may be partly based on a change in relative rankings among search results generated by the original and revised queries. As another example, the confidence score for a substitute term may be partly based on the number of new search results generated by the revised query. Alternatively, the administrator of the search system 130 may manually assign the confidence score to a substitute term The query reviser engine 170 communicates the one or more revised queries 135 to the search system front-end 140 during state (E). The search system front-end 140 communicates the original query 105 along with the one or more revised queries 135 to the search engine 150 as all queries 137 during state (F). The search engine 150 generates search results 145 that it identifies as being responsive to the original query 105 and/or the one or more revised queries 135. The search engine 150 can identify search results 145 for each query using an index database 160 that stores indexed resources (e.g., web pages, images, or news articles on the Internet). The search engine 150 can combine and rank the identified search results 145 and communicate the search results 145 to the search system front-end 140 during state (G).

The search system front-end 140 generates a search results page 155 that identifies the search results 145. For example, each of the search results 145 can include, but are not limited to, titles, text snippets, images, links, reviews, or other information. The original query terms 115 or the substitute terms 125 that appear in the search results 145 can be formatted in a particular way (e.g., in bold print and/or italicized print). For example, the search system front-end 140 transmits a document that includes markup language (e.g., HyperText Markup Language or eXtensible Markup Language) for the search results page 155 to the client device 110 over the network 120 at state (H). The client device 110 reads the document (e.g., using a web browser) in order to display the search results page 155 on display device 118. The client device 110 can display the original query terms 115 of the original query 105 in a query box (or "search box"), located, for example, on the top of the search results page 155. In addition, the client device 110 can display the search results 145 in a search results box, for example, located on the left-hand side of the search results page 155.

Figure 2A:
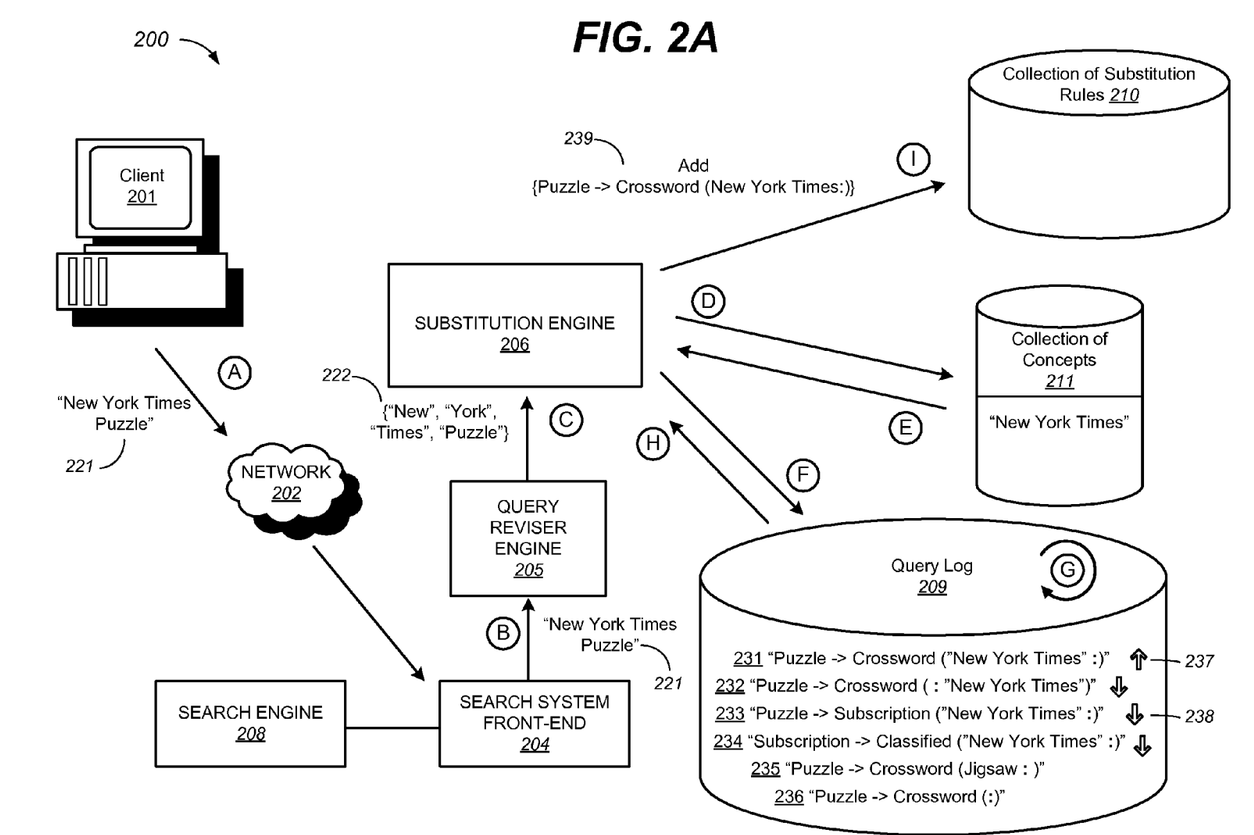
FIG. 2A is a diagram of an example system that identifies a concept in a query, and collects substitution data to determine one or more substitution rules in the context of the identified concept.

FIG. 2A is a diagram of an example system that identifies a concept in a query, and collects substitution data to determine one or more substitution rules in the context of the identified concept. In general, when a user submits an original query to the system 200, the user may or may not know the best query terms for obtaining the most relevant search results. The system 200 may attempt to improve the search result quality by revising the original query to include a substitute query term corresponding to an original query term based on a substitution rule. The system 200 may identify one or more concepts in the original query, and apply the identified concepts as the context of the original query term. In general, the system 200 includes a client device 201, a network 202, a search system front-end 204, a query reviser engine 205, a substitution engine 206, a search engine 208, a query log 209, and a collection of substitution rules 210.

In general, the search system front-end 204 coordinates the requests and responses among the client device 201, the query reviser engine 205, the substitution engine 206, and the search engine 208. For example, when a user operating the client device 201 issues an original query, the original query can be routed to the search system front end 204 through the network 202. In some implementations, the search system front end 204 can forward the original query to the query reviser engine 205 to determine whether and how to revise the original query. Then, upon receiving a response including a revised query from the query reviser engine 205, the search system front-end 204 forwards the revised query to the search engine 208. Once the search engine 208 identifies search results, the search engine 208 sends the search results to the search system front-end 204. Then, the search system front-end 204 sends the search results to the client device 201 and to the substitution engine 206.

In more detail, the query reviser engine 205 receives an original query from the search system front-end 204 as an input, and based on the substance of the original query, the query reviser engine 205 can generate a revised query by adding, substituting, or removing query terms in the original query. For example, the query reviser engine 205 can generate a revised query to include substitute terms of the original query terms. In some implementations, the query reviser engine 205 can generate a revised query using substitute terms of one or more of the original query terms. The query reviser engine 205 can obtain substitute terms for revising the original query from the substitution engine 206. In some implementations, the query reviser engine 206 may generate a revised query term based on a normalization of diacriticals. For example, the query reviser engine 206 may replace each "é" in "résumé" with and "e" to generate a substitute term "resume."

In more detail, the substitution engine 206 applies one or more substitution rules from a collection 210 of substitution rules to an original query term, and provides the query reviser engine 205 with a substitute term for the input query term. The collection 210 of substitution rules is, for example, a list or other data structure that specifies which substitute terms or substitution rules that a query reviser may use to revise search queries. In an alternative implementation, the collection 210 of substitution rules may be a list of substitute terms or substitution rules that a query reviser may not use to revise search queries. In some implementations, the substitution engine 206 can add a new substitution rule to the collection 210 upon evaluation of the new substitution rule. In some implementations, the substitution engine 206 can remove an existing substitution rule from the collection 210 upon evaluation of the existing substitution rule.

In some implementations, the search engine 208 can generate search results based on the collective activity of the search system front-end 204, the query reviser engine 205, and the substitution engine 206. For example, the search engine 208 can receive the revised query from the search system front-end 204, where the revised query may include substitute terms of the original query terms. The search engine 208 can then generate search results based on the revised query, and send the search results to the search system front-end 204.

The user query log 209 is a repository which stores usage data associated with search results. The usage data can be collected and aggregated over time based on users' interactions with search results, including the search results generated by revised queries based on substitution rules. The usage data can include information regarding the substitution rules applied to the original query terms, the search results generated by the search engine 208, and the users' interactions with the search results. In some implementations, the usage data may include the contexts associated with the substitution rules. In some implementations, protective steps may be taken with respect to user privacy. For example, depending on the particular type of data being used, the services being provided, and the ability to provide certain services with modified data, a system may provide users with the opportunity to opt in/out of services that may collect personal information, and may partially or fully anonymize data stored in the query log 209 so as to prevent personally identifiable information from being disclosed.

A substitution rule in the collection 210 is a rule which has been selected for use by a query reviser engine 205 in revising search queries. The selection can be determined by an evaluation or test under certain criteria. In some implementations, the substitution engine 206 performs the evaluation. In some implementations, substitution rules are stored in the collection 210 as a data structure. The data structure may be constructed in any type of format (e.g., text, binary, etc.), as long as the system 200 can modify the data structure within the collection 210. In some implementations, the substitution rule can either be in the general context, in which the substitution rule applies regardless of other terms in the query, or the substitution rule can be context-specific, in which the substitution rule only applies when other particular words are in the query. For example, a substitution rule "(Y→Z)" indicates that a query reviser may revise search queries that include the query term "Y" to include the query term "Z."

In some implementations, the substitution engine 206 may use a concept as the context associated with a query term in a query. In general, a concept is a query term or a series of sequential query terms representing a specific meaning when combined together. For example, "New York City" may be a concept representing a name of a city, while "New York Times" may be a concept representing a name of a newspaper. In some implementations, the substitution engine 206 may combine two or more concepts as the context associated with a query term. Concepts may be stored in a collection 211 of concepts as a data structure. The data structure may be constructed in any type of format (e.g., text, binary, etc.), as long as the system 200 can modify the data structure within the collection 211. The substitution engine 206 may use one or more concepts as the context associated with a query term in collecting query term substitution data or in determining a substitution rule for the query term. The concept applied may be one word (unigram), two words (bigram), or N word (N-gram), where N is an integer.

FIG. 2A also illustrates an example flow of data describing a process of collecting usage data for substitution rule evaluation based on identified concepts, shown in states (A) to (K). States (A) to (K) may occur in the illustrated sequence, or they may occur in a sequence that is different than in the illustrated sequence. In some implementations, one or more of the States (A) to (K) may occur offline, where the search system may perform computations when some users are not connected to the search system. During state (A), a user operating a client device 201 makes an original query 221 "New York Times Puzzle". The original query 221 is transmitted to the network 202, where the network 202 then routes the original query 221 to the search system front-end 204.

During state (B), the search system front-end 204 receives the original query 221, and forwards the original query 221 to the query reviser engine 205. During state (C), the query reviser engine 205 communicates original query terms of an original query to the substitution engine 206. In some implementations, an original query may include logical operators (e.g. "AND", "OR", "NOT") between original query terms, and the query reviser engine 205 may group or separate original query terms accordingly. In some implementations, an original query may include special symbols for grouping original query terms (e.g. quotation marks), and the query reviser engine 205 may group original query terms accordingly. In this present example, the query reviser engine 205 separates the original query 221 and forwards the original query terms 222 {"New", "York", "Times", "Puzzle"} to the substitution engine 206.

During state (D), the substitute engine 206 analyzes the original query terms to determine whether one or more original query terms can form at least one concept. In some implementations, a concept may be a query term. In some implementations, a concept may be a grouping of sequential query terms, and can extend beyond three query terms ("trigram") or n query terms ("n-gram"), where n is any positive integer.

In some implementations, a concept includes two or more words that interrelate in a way such that the two or more words, in combination, have a meaning which is different than the independent meanings of the words in isolation. In general, the substitution engine 206 may treat a concept as one term in determining the context of an original query, so more query terms may be considered without adding prohibitively large computation complexity. In some implementations, concepts are predetermined and stored at a collection 211 of concepts, and the substitution engine 206 may query the collection 211 of concepts about a particular combination of sequential query terms to determine whether the particular combination represents a concept.

Concepts may be identified offline by the substitution engine 206 prior to the client 201 making a search query. In some implementations, concepts may be identified automatically by parsing through a particular textual reference (e.g. a dictionary of phrases, a book's index, etc.). In some other implementations, concepts may be identified by analyzing the query log 209. For example, if a user's query in the past contains a grouping of query terms using either logical operator "AND" or quotation marks around the query terms, the substitution engine 206 may identify the grouping of query terms as a concept and store the concept in the collection 211.

In this present example, the substitution engine 206 queries the collection 211 of concepts to determine whether the original query terms 222 can be combined to match with one or more existing concepts. In some implementations, the substitution engine 206 may try to query the collection 211 with all potential combinations for a possible match. For example, the substitution engine 206 may query the collection 211 with all of the following: "New", "York", "Times", "Puzzle", "New York", "York Times", "Times Puzzle", "New York Times", "York Times Puzzle", and "New York Times Puzzle" for a match with one or more concepts. In some implementations, the substitution engine 206 may query the collection 211 with a subset of the combination of query terms.

During state (E), if the collection 211 of concepts matches at least one combination of sequential query terms with an existing concept in the collection 211, the collection 211 forwards an indication of the match to the substitution engine 206. In some implementations, the substitution engine 206 may determine to start collecting query term substitution data for queries containing the concept upon receiving the indication from the collection 211 of concepts. In this particular example, the collection 211 of concepts matches the combination "New York Times" as an existing concept in the collection 211, and sends an indication of the match to the substitution engine 206.

During state (F), the substitution engine 206 sends an indication to the query log 209 to start collecting query term substitution data for subsequent queries containing the concept "New York Times." During state (G), the query log 209 starts to collect query term substitution data for queries containing the concept identified by the substitution engine 206. In general, query term substitution data is collected from queries submitted by multiple different clients over the network 202. The query log 209 may collect the query term substitution data in a number of ways. In some implementations, the query log 209 may collect raw frequency data on how many times a query with a particular original query term in the context of the concept have been submitted over a period of time. In some implementations, the query log 209 may collect how often different users switch from a query with an original query term to a query with a substitute query term in the context of the concept. In some other implementations, the query log 209 may collect how a particular user manually modifies an original query term to a substitute query term in the context of the concept at different instances of time. In some other implementations, the query log 209 may collect search results generated by queries containing an original query term in the context of the concept, and search results generated by queries containing a substitute query terms in the context of the concept.

In this particular example, the query log 209 begins to collect query term substitution data for queries containing the concept "New York Times". The query log 209 collects query term substitution data 231 associated with a potential substitute term "Crossword" for queries containing the original query term "Puzzle" adjacent to the right side of the concept, i.e. "New York Times Puzzle". In some implementations, the query log 209 may also collect query term substitution data 232 associated with the potential substitute term "Crossword" for queries containing the original query term "Puzzle" adjacent to the left side of the concept, i.e. "Puzzle New York Times". The query log 209 also collects query term substitution data 233 associated with a potential substitute term "Subscription" for queries containing the original query term "Puzzle" adjacent to the right side of the concept. In some implementation, the query log 209 may also collect a query term from subsequent queries that is not in the original query 221. For example, the query log 209 may collect query term substitution data 234 associated with a potential substitute term "Classified" for queries containing the original query term "Subscription" adjacent to the right side of the concept "New York Times". In some implementations, the query log 209 may also collect query term substitution data 236 associated with a potential substitute term for queries containing the original query term in the general context, or query term substitution data 235 associated with a potential substitute term containing the original query term in another specific context (e.g. "Jigsaw").

During state (H), the substitution engine 206 may request an aggregation of query term substitution data associated with a concept collected over time. In some implementations, the substitution engine 206 may directly request the aggregated query term substitution data from the query log 209. In some implementations, the query log 209 may send the aggregated query term substitution data to the substitution engine 206 periodically. In some implementations, the query log 209 may send the query term substitution data to the substitution engine 206 when the aggregated query term substitution data meets a criterion (e.g. reaching a pre-determined number of user queries). In this particular example, the substitution engine 206 requests the aggregated query term substitution data associated with the concept "New York Times," and the receives query term substitution data 231, 232, 233, and 234 from the query log 209.

During state (I), the substitution engine 206 analyzes the aggregated query term substitution data, and determines whether one or more substitution rules may be generated from the analysis. For one example, the substitution engine 206 may determine from the query term substitution data 231 that the term "Crossword" is frequently a substitute term for the term "Puzzle" in the context of the concept "New York Times," as indicated by a positive indication 237. In some implementations, the indication 237 may be a quantitative score assigned to the query term substitution data 231 in the query log 209, and the quantitative score can be analyzed by one or more criteria in the substitution engine's evaluation of a potential substitute term. For another example, the substitution engine 206 may determine from the query term substitution data 233 that the term "Subscription" is not frequently a substitute term for the term "Puzzle" in the context of the concept "New York Times," as indicated by a negative indication 238. Here, the substitution engine 206 determines that the term "Crossword" is frequently a substitute term for the term "Puzzle" in the context of "New York Times", and sends an indication 239 to the collection 210 of substitution rules to add the substitution rule "Puzzle→Crossword (New York Times :)" to the collection 210. For subsequent user queries that contain original query terms "New York Times Puzzles", the substitution engine 206 may then apply the substitution rule "Puzzle→Crossword (New York Times :)" and communicate with the query reviser engine 205 to include the substitute term "Crossword" in the revised query.

Figure 2B:
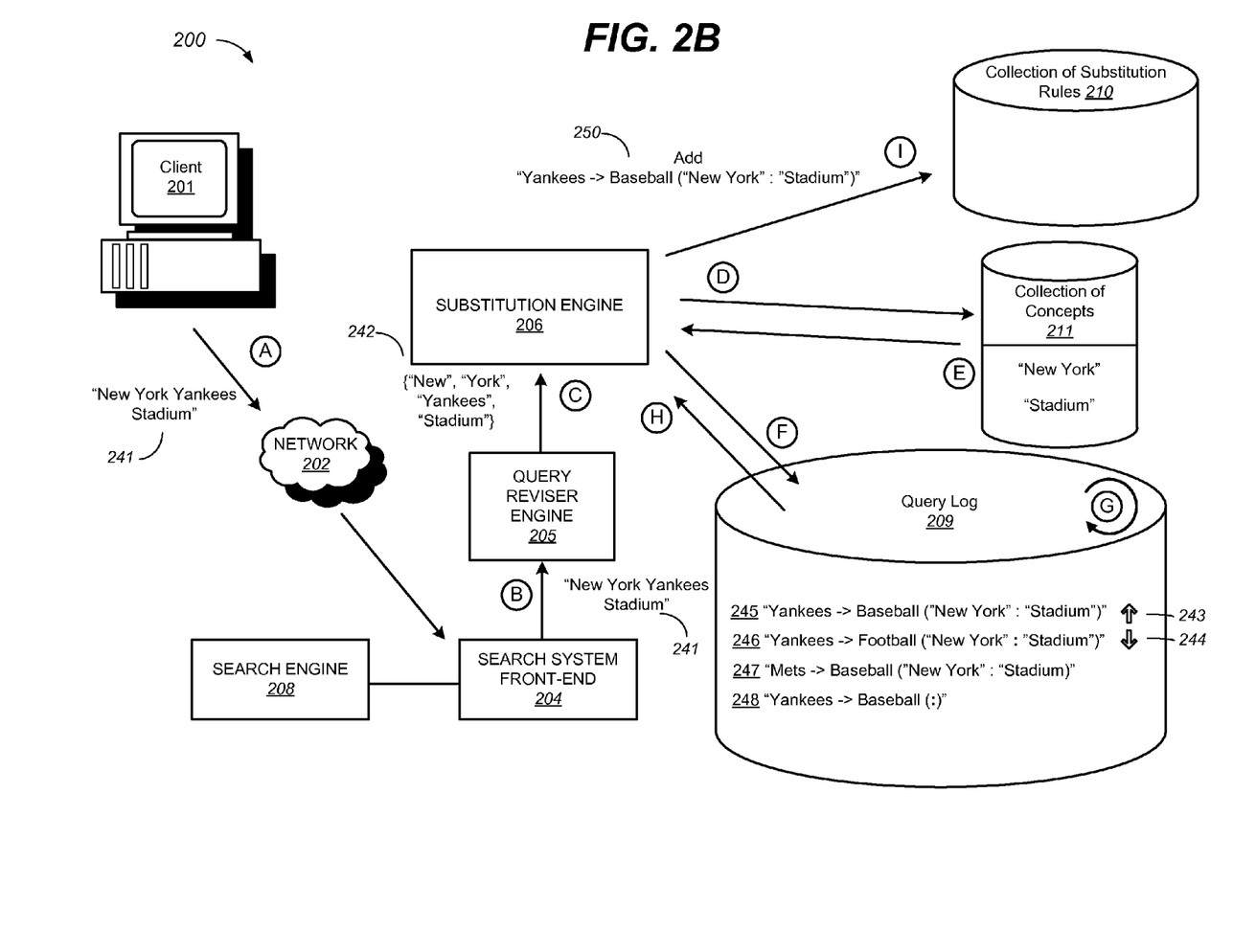
FIG. 2B is a diagram of an example system that identifies two concepts in a query, and collects substitution data to determine one or more substitution rules in the context of the identified concepts.

FIG. 2B is a diagram of an example system that identifies two concepts in a query, and collects substitution data to determine one or more substitution rules in the context of the identified concepts. FIG. 2B also illustrates an example flow of data describing a process of collecting usage data for substitution rule evaluation based on identified concepts, shown in states (A) to (K). States (A) to (K) may occur in the illustrated sequence, or they may occur in a sequence that is different than in the illustrated sequence. In some implementations, one or more of the States (A) to (K) may occur offline, where the search system may perform computations when some users are not connected to the search system. During state (A), a user operating a client device 201 makes an original query 241 "New York Yankees Stadium". The original query 241 is transmitted to the network 202, where the network 202 then routes the original query 241 to the search system front-end 204.

During state (B), the search system front-end 204 receives the original query 241, and forwards the original query 241 to the query reviser engine 205. During state (C), the query reviser engine 205 communicates original query terms of an original query to the substitution engine 206. In this present example, the query reviser engine 205 separates the original query 241 and forwards the original query terms 242 {"New", "York", "Yankees", "Stadium"} to the substitution engine 206.

During state (D), the substitute engine 206 analyzes the original query terms to determine whether one or more original query terms can form at least one concept. In this present example, the substitution engine 206 queries the collection 211 of concepts to determine whether the original query terms 242 can be combined to match with one or more existing concepts.

During state (E), if the collection 211 of concepts matches at least one combination of sequential query terms with an existing concept in the collection 211, the collection 211 forwards an indication of the match to the substitution engine 206. In this particular example, the collection 211 of concepts matches two combinations "New York" and "Stadium" as existing concepts in the collection 211, and sends an indication of the two matches to the substitution engine 206.

During state (F), the substitution engine 206 sends an indication to the query log 209 to start collecting query term substitution data for subsequent queries containing the concepts "New York" and "Stadium". During state (G), the query log 209 starts to collect query term substitution data for queries containing the concepts identified by the substitution engine 206. In this particular example, the query log 209 begins to collect query term substitution data for queries containing the concepts "New York" and "Stadium". The query log 209 collects query term substitution data 245 associated with a potential substitute term "Baseball" for queries containing the original query term "Yankees" adjacent to the right side of the concept "New York" and to the left side of the concept "Stadium", i.e. "New York Yankees Stadium". In some implementations, the query log 209 may also collect query term substitution data 246 associated with another potential substitute term "Football" for queries containing the original query term "Yankees" adjacent to the right side of the concept "New York" and to the left side of the concept "Stadium". In some implementation, the query log 209 may also collect a query term from subsequent queries that is not in the original query 241. For example, the query log 209 may collect query term substitution data 247 associated with a potential substitute term "Baseball" for queries containing the original query term "Mets" adjacent to the right side of the concept "New York" and to the left side of the concept "Stadium". In some implementations, the query log 209 may also store collect query term substitution data 248 associated with a potential substitute term for queries containing the original query term in the general context, or query term substitution data associated with a potential substitute term containing the original query term in another specific context.

During state (H), the substitution engine 206 may request an aggregation of query term substitution data associated with a concept collected over time. In this particular example, the substitution engine 206 requests the aggregated query term substitution data associated with the concepts "New York" and "Stadium", and the receives query term substitution data 245, 246, 247, and 248 from the query log 209.

During state (I), the substitution engine 206 analyzes the aggregated query term substitution data, and determines whether one or more substitution rules may be generated from the analysis. For one example, the substitution engine 206 may determine from the query term substitution data 245 that the term "Baseball" is frequently a substitute term for the term "Yankees" in the context of the concepts "New York" and "Stadium," as indicated by a positive indication 243. In some implementations, the indication 243 may be a quantitative score assigned to the query term substitution data 245 in the query log 209, and the quantitative score can be analyzed by one or more criteria in the substitution engine's evaluation of a potential substitute term. For another example, the substitution engine 206 may determine from the query term substitution data 246 that the term "Football" is not frequently a substitute term for the term "Yankees" in the context of the concepts "New York" and "Stadium," as indicated by a negative indication 244. Here, the substitution engine 206 determines that the term "Baseball" is frequently a substitute term for the term "Yankees" in the context of combined concepts "New York" and "Stadium", and sends an indication 250 to the collection 210 of substitution rules to add the substitution rule "Yankees→Baseball ("New York": "Stadium")" to the collection 210. For subsequent user queries that contain original query terms "New York Yankees Stadium", the substitution engine 206 may then apply the substitution rule "Yankees→Baseball ("New York": "Stadium")" and communicate with the query reviser engine 205 to include the substitute term "Baseball" in the revised query.

Figure 2C:
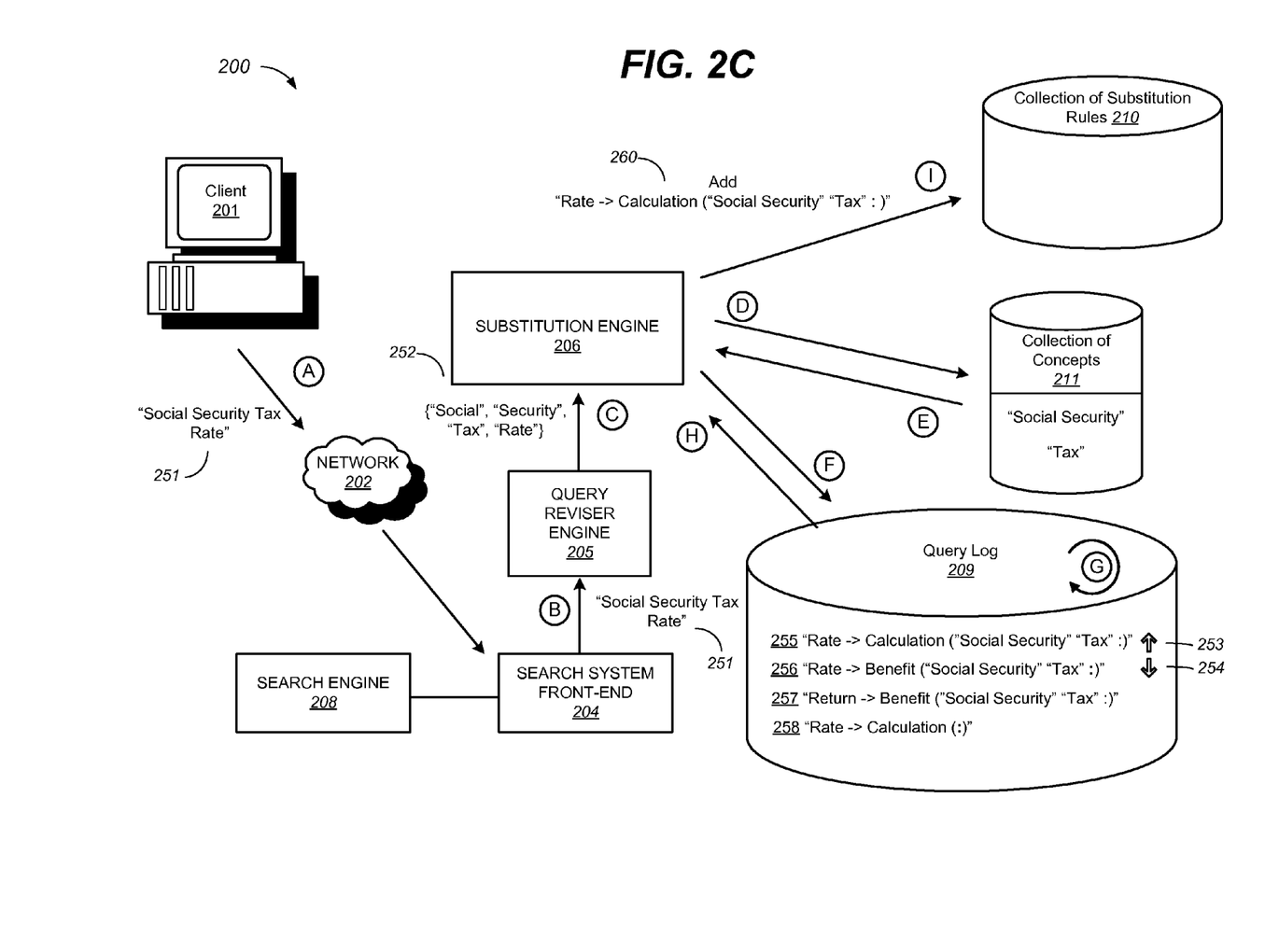
FIG. 2C is a diagram of an example system that identifies two adjacent concepts in a query, and collects substitution data to determine one or more substitution rules in the context of the identified concepts.

FIG. 2C is a diagram of an example system that identifies two adjacent concepts in a query, and collects substitution data to determine one or more substitution rules in the context of the identified concepts. FIG. 2C also illustrates an example flow of data describing a process of collecting usage data for substitution rule evaluation based on identified concepts, shown in states (A) to (K). States (A) to (K) may occur in the illustrated sequence, or they may occur in a sequence that is different than in the illustrated sequence. In some implementations, one or more of the States (A) to (K) may occur offline, where the search system may perform computations when some users are not connected to the search system. During state (A), a user operating a client device 201 makes an original query 251 "Social Security Tax Rate". The original query 251 is transmitted to the network 202, where the network 202 then routes the original query 251 to the search system front-end 204.

During state (B), the search system front-end 204 receives the original query 251, and forwards the original query 251 to the query reviser engine 205. During state (C), the query reviser engine 205 communicates original query terms of an original query to the substitution engine 206. In this present example, the query reviser engine 205 separates the original query 241 and forwards the original query terms 252 {"Social", "Security", "Tax", "Rate"} to the substitution engine 206.

During state (D), the substitute engine 206 analyzes the original query terms to determine whether one or more original query terms can form at least one concept. In this present example, the substitution engine 206 queries the collection 211 of concepts to determine whether the original query terms 252 can be combined to match with one or more existing concepts.

During state (E), if the collection 211 of concepts matches at least one combination of sequential query terms with an existing concept in the collection 211, the collection 211 forwards an indication of the match to the substitution engine 206. In this particular example, the collection 211 of concepts matches two combinations "Social Security" and "Tax" as existing concepts in the collection 211, and sends an indication of the two matches to the substitution engine 206.

During state (F), the substitution engine 206 may combine the two concepts "Social Security" and "Tax" as a context, and sends an indication to the query log 209 to start collecting query term substitution data in the context of the combined concepts for subsequent queries containing the concepts "Social Security" and "Tax". During state (G), the query log 209 starts to collect query term substitution data for queries containing the concepts identified by the substitution engine 206. In this particular example, the query log 209 begins to collect query term substitution data for queries containing the concepts "Social Security" and "Tax". The query log 209 collects query term substitution data 255 associated with a potential substitute term "Calculation" for queries containing the original query term "Rate" adjacent to the right side of the concepts "Social Security" and "Tax", i.e. "Social Security Tax Rate". In some implementations, the query log 209 may also collect query term substitution data 256 associated with another potential substitute term "Benefit" for queries containing the original query term "Rate" adjacent to the right side of the concepts "Social Security" and "Tax". In some implementation, the query log 209 may also collect a query term from subsequent queries that is not in the original query 251. For example, the query log 209 may collect query term substitution data 257 associated with a potential substitute term "Benefit" for queries containing the original query term "Return" adjacent to the right side of the concepts "Social Security" and "Tax". In some implementations, the query log 209 may also store collect query term substitution data 258 associated with a potential substitute term for queries containing the original query term in the general context, or query term substitution data associated with a potential substitute term containing the original query term in another specific context.

During state (H), the substitution engine 206 may request an aggregation of query term substitution data associated with a concept collected over time. In this particular example, the substitution engine 206 requests the aggregated query term substitution data associated with the concepts "Social Security" and "Tax", and the receives query term substitution data 255, 256, 257, and 258 from the query log 209.

During state (I), the substitution engine 206 analyzes the aggregated query term substitution data, and determines whether one or more substitution rules may be generated from the analysis. For one example, the substitution engine 206 may determine from the query term substitution data 255 that the term "Calculation" is frequently a substitute term for the term "Rate" in the context of the concepts "Social Security" and "Tax" as indicated by a positive indication 253. In some implementations, the indication 253 may be a quantitative score assigned to the query term substitution data 255 in the query log 209, and the quantitative score can be analyzed by one or more criteria in the substitution engine's evaluation of a potential substitute term. For another example, the substitution engine 206 may determine from the query term substitution data 256 that the term "Benefit" is not frequently a substitute term for the term "Rate" in the context of the concepts "Social Security" and "Tax," as indicated by a negative indication 254. Here, the substitution engine 206 determines that the term "Calculation" is frequently a substitute term for the term "Rate" in the context of combined concepts "Social Security" and "Tax", and sends an indication 260 to the collection 210 of substitution rules to add the substitution rule "Rate→Calculation ("Social Security" "Tax":)" to the collection 210. For subsequent user queries that contain original query terms "Social Security Tax Rate", the substitution engine 206 may then apply the substitution rule "Rate→Calculation ("Social Security" "Tax":)" and communicate with the query reviser engine 205 to include the substitute term "Calculation" in the revised query.

Figure 3:
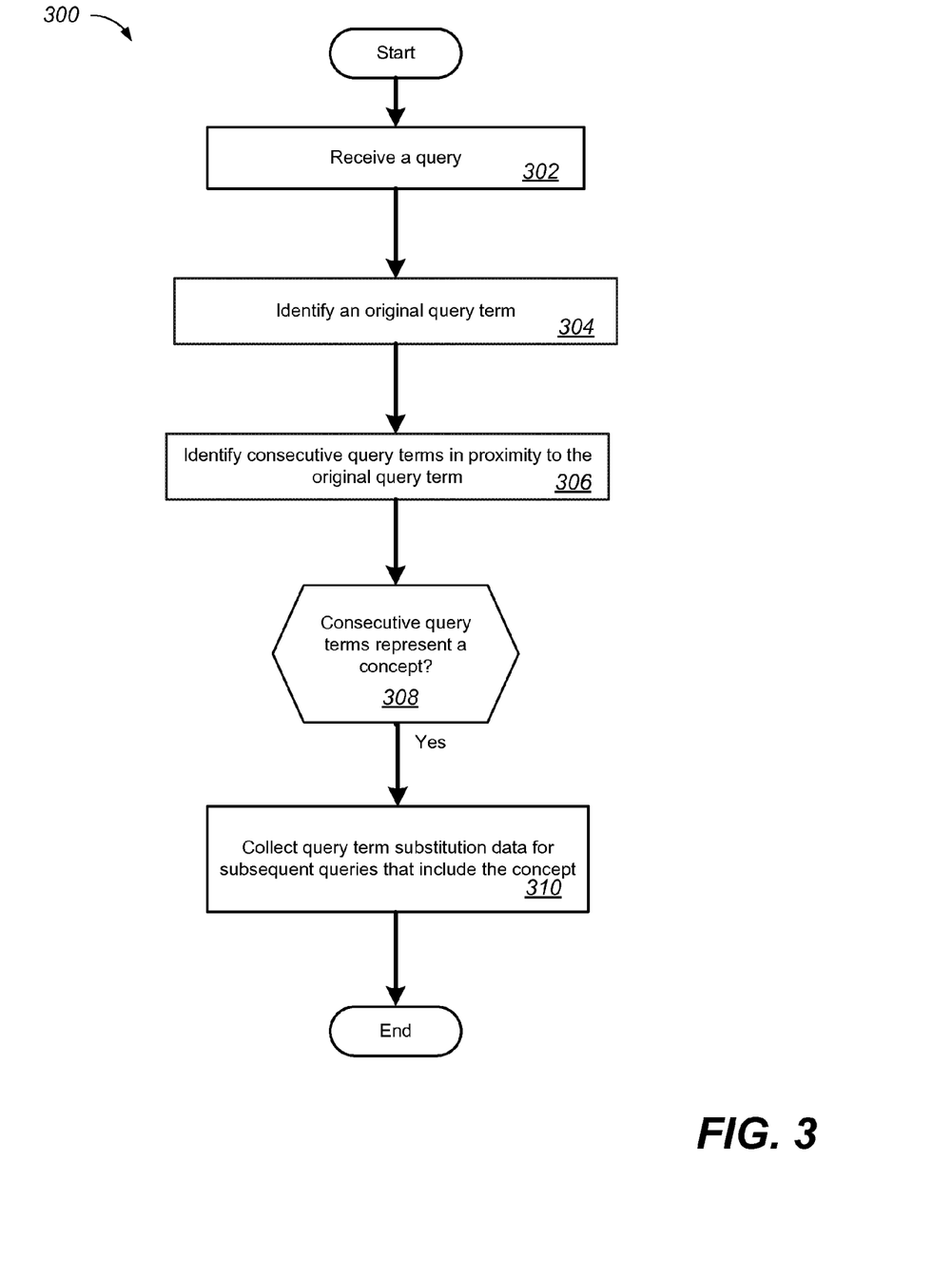
FIG. 3 is a flow chart illustrating an example process for collecting substitution data in the context of identified concepts.

FIG. 3 is a flow chart illustrating an example process for collecting substitution data in the context of identified concepts. In general, the process 300 identifies one or more concepts in a search query, and collects substitution data in the context of identified concepts from subsequent search queries. The process 300 will be described as being performed by a computer system comprising one or more computers, for example, the substitution engine 206 as shown in FIG. 2A.

The system receives an original search query, where the original query includes one or more search query terms (302). For example, a user can submit the original query by initiating a search dialogue on the client device, speaking or typing the original query terms of the original query, and then pressing a search initiation button or control on the client device. The client device formulates the original query (e.g., by specifying search parameters). The client device transmits the original query over the network to the system.

The system identifies an original query term in the search query (304). In some implementations, the identification may occur offline, where the system may perform computations when some users are not connected to the system. In some implementations, the system may identify and parse through all original query terms in the original query. In some other implementations, the system may identify original query terms that are predefined in a list of candidate original query terms in a database of the system. In some other implementations, the system may identify original query terms that are excluded from the system. For example, the system may exclude an article (e.g. "a", "the", "an", etc.) or a preposition (e.g. "in", "on", "at", etc.) as a candidate original query term.

The system identifies one or more sequential query terms in proximity to the original query term (306). In some implementations, the identification may occur offline, where the system may perform computations when some users are not connected to the system. In some implementations, an original query may include logical operators (e.g. "AND", "OR", "NOT") between original query terms, and the system may group or separate original query terms accordingly. In some other implementations, an original query may include special symbols for grouping original query terms (e.g. quotation marks), and the system may group original query terms accordingly. In some other implementations, the system may try all potential combinations for a possible match. For example, if the system receives an original query "New York Times Puzzle," the system may identify all of the following combinations: "New", "York", "Times", "Puzzle", "New York", "York Times", "Times Puzzle", "New York Times", "York Times Puzzle", and "New York Times Puzzle." In some other implementations, the system may identify a subset of all the query term combinations.

The system determines that the sequential query terms represent at least one concept (308). In some implementations, a concept may be a query term. In some implementations, a concept may be a grouping of sequential query terms, and can extend beyond three query terms ("trigram") or n query terms ("n-gram"), where n is any positive integer. In some implementations, a concept includes two or more words that interrelate in a way such that the two or more words, in combination, have a meaning which is different than the independent meanings of the words in isolation. In general, the system may treat a concept as one term in determining the context of an original query, so more query terms may be considered without adding prohibitively large computation complexity. In some implementations, concepts are predetermined and stored at a collection of concepts, and the system may query the collection of concepts about a particular combination of sequential query terms to determine whether the particular combination represents a concept.

Concepts may be identified offline by the system prior to the client making a search query. In some implementations, concepts may be identified automatically by parsing through a particular textual reference (e.g. a dictionary of phrases, a book's index, etc.). In some other implementations, concepts may be identified by analyzing the query log. For example, if a user's query in the past contains a grouping of query terms using either logical operator "AND" or quotation marks around the query terms, the system may identify the grouping of query terms as a concept and store the concept in the collection of concepts.

In response to determining that the sequential query terms represent at least one concept, the system collects query term substitution data for subsequent queries that include the at least one concept (310). If the collection of concepts matches at least one combination of sequential query terms with an existing concept, the system may determine to start collecting query term substitution data for queries containing the concept upon receiving the indication from the collection of concepts. In some implementations, protective steps may be taken with respect to user privacy. For example, depending on the particular type of data being used, the services being provided, and the ability to provide certain services with modified data, a system may provide users with the opportunity to opt in/out of services that may collect personal information, and may partially or fully anonymize data stored in the query log 209 so as to prevent personally identifiable information from being disclosed.

In general, query term substitution data is collected in the query log from queries submitted by multiple different clients over the network. The system may collect the query term substitution data in a number of ways. In some implementations, the system may collect how often different users switch from a query with an original query term to a query with a substitute query term in the context of the concept. In some other implementations, the system may collect how a particular user manually modifies an original query term to a substitute query term in the context of the concept at different instances of time. In some other implementations, the system may collect search results generated by queries containing an original query term in the context of the concept, and search results generated by queries containing a substitute query terms in the context of the concept.

The system may analyze the aggregated query term substitution data, and determines whether one or more substitution rules may be generated from the analysis. If the system decides to add a substitution rule, for subsequent user queries that contain the original query term and the concept, the system may then apply the substitution rule to include the substitute term in the revised query.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a first term, a second term, and a third term;
   determining, by one or more computers, that a phrase that includes the first term, the second term, and the third term has a collective meaning that is different than each of a meaning of the first term, a meaning of the second term, and a meaning of the third term; and
   in response to determining that the phrase that includes the first term, the second term, and the third term has a collective meaning that is different than each of the meaning of the first term, the meaning of the second term, and the meaning of the third term:
      identifying, in a collection of search queries, an original search query that includes: (i) the phrase that includes the first term, the second term, and the third term, and (ii) an additional, original search query term that is not included in the phrase;
      determining a number of times that, in the collection of search queries, the original query that includes (i) the phrase that includes the first term, the second term, and the third term, and (ii) the additional, original search query term that is not included in the phrase, is followed by
         a revised search query that includes: (i) the phrase that includes the first term, the second term, and the third term, and (ii) an additional, revised search query term that is different than the additional, original search query term and that is not included in the phrase; and
      determining, based on the number of times, whether to revise a subsequently received search query that includes: (i) the phrase that includes the first term, the second term, and the third term, and (ii) the additional, original search query term, to include the additional, revised search query term.

2. The computer-implemented method of claim 1, further comprising:
   determining whether to generate a substitution rule based on the number of times and the collective meaning of the phrase that includes the first term, the second term, and the third term; and
   generating and storing the substitution rule in response to determining that the substitution rule is to be generated.

3. The computer-implemented method of claim 2, wherein the substitution rule is determined to be generated in response to the number of times satisfying a frequency threshold.

4. The computer-implemented method of claim 1, wherein the substitution rule comprises a rule to substitute a first search query that includes: (i) the phrase that includes the first term, the second term, and the third term, and (ii) the additional, original search query term that is not included in the phrase,
   with a second search query that includes: (i) the phrase that includes the first term, the second term, and the third term, and (ii) the additional, revised search query term that is different than the additional, original search query term and that is not included in the phrase.

5. The computer-implemented method of claim 4, further comprising:
   ranking the first search query and the second search query based at least on (i) a number of times the first search query is submitted to a search engine, and (ii) a number of times that the first search query is followed by the second search query in the collection of search queries.

6. The computer-implemented method of claim 1, wherein the additional, original search query term includes at least one of: (i) a substitute of at least one additional term of received terms other than the first term, the second term, and the third term, or (ii) an associate term associated with the collective meaning of the phrase that includes the first term, the second term, and the third term.

7. The computer-implemented method of claim 1, wherein determining the collective meaning of the phrase that includes the first term, the second term, and the third term comprises:
   determining whether the collective meaning of the phrase that includes the first term, the second term, and the third term matches a stored concept.

8. A non-transitory computer-readable storage medium comprising instructions, which, when executed by one or more computers, cause the one or more computers to perform operations of:
   receiving a first term, a second term, and a third term;
   determining that a phrase that includes the first term, the second term, and the third term has a collective meaning that is different than each of a meaning of the first term, a meaning of the second term, and a meaning of the third term;
   in response to determining that the phrase that includes the first term, the second term, and the third term has a collective meaning that is different than each of the meaning of the first term, the meaning of the second term, and the meaning of the third term:
      identifying, in a collection of search queries, an original search query that includes: (i) the phrase that includes the first term, the second term, and the third term, and (ii) an additional, original search query term that is not included in the phrase;
      determining a number of times that, in the collection of search queries, the original query that includes (i) the phrase that includes the first term, the second term, and the third term, and (ii) the additional, original search query term that is not included in the phrase, is followed by
         a revised search query that includes: (i) the phrase that includes the first term, the second term, and the third term, and (ii) an additional, revised search query term that is different than the additional term and that is not included in the phrase; and
      determining, based on the number of times, whether to revise a subsequently received search query that includes: (i) the phrase that includes the first term, the second term, and the third term, and (ii) the additional, original search query term, to include the additional, revised search query term.

9. The non-transitory computer-readable storage medium of claim 8, wherein the one or more computers are further configured to perform operations comprising:
   determining whether to generate a substitution rule based on the number of times and the collective meaning of the phrase that includes the first term, the second term, and the third term; and
   generating and storing the substitution rule in response to determining that the substitution rule is to be generated.

10. The non-transitory computer-readable storage medium of claim 9, wherein the substitution rule is determined to be generated in response to the number of times satisfying a frequency threshold.

11. The non-transitory computer-readable storage medium of claim 8, wherein the substitution rule comprises a rule to substitute a first search query that includes: (i) the phrase that includes the first term, the second term, and the third term, and (ii) the additional, original search query term that is not included in the phrase,
   with a second search query that includes: (i) the phrase that includes the first term, the second term, and the third term, and (ii) the additional, revised search query term that is different than the additional, original search query term and that is not included in the phrase.

12. The non-transitory computer-readable storage medium of claim 11, wherein the one or more computers are further configured to perform operations comprising:
   ranking the first search query and the second search query based at least on (i) a number of times the first search query is submitted to a search engine, and (ii) a number of times that the first search query is followed by the second search query in the collection of search queries.

13. The non-transitory computer-readable storage medium of claim 8, wherein the additional, original search query term includes at least one of: (i) a substitute of at least one additional term of received terms other than the first term, the second term, and the third term, or (ii) an associate term associated with the collective meaning of the phrase that includes the first term, the second term, and the third term.

14. The non-transitory computer-readable storage medium of claim 8, wherein determining the collective meaning of the phrase that includes the first term, the second term, and the third term comprises:
   determining whether the collective meaning of the phrase that includes the first term, the second term, and the third term matches a stored concept.

15. A system comprising:
   one or more computers and one or more storage devices storing instructions that are operable, when executed by one or more computers, cause the one or more computers to perform operations comprising:
      receiving a first term, a second term, and a third term;
      determining that a phrase that includes the first term, the second term, and the third term has a collective meaning that is different than each of a meaning of the first term, a meaning of the second term, and a meaning of the third term;
      in response to determining that the phrase that includes the first term, the second term, and the third term has a collective meaning that is different than each of the meaning of the first term, the meaning of the second term, and the meaning of the third term:
         identifying a query that includes: (i) the phrase that includes the first term, the second term, and the third term, and (ii) an additional term that is not included in the phrase, and
         determining a number of times that, in a collection of search queries, the query including: (i) the phrase that includes the first term, the second term, and the third term, and (ii) the additional term that is not included in the phrase, is followed by a search query that includes: (i) the phrase that includes the first term, the second term, and the third term, and (ii) a fourth term that is different than the additional term and that is not included in the phrase; and
         determining, based on the number of times, whether to revise a subsequently received search query that includes: (i) the phrase that includes the first term, the second term, and the third term, and (ii) the additional term, to also include the fourth term.

16. The system of claim 15, wherein the one or more computers are further configured to perform operations comprising:
- determining whether to generate a substitution rule based on the number of times and the collective meaning of the phrase that includes the first term, the second term, and the third term; and
- generating and storing the substitution rule in response to determining that the substitution rule is to be generated, wherein the substitution rule is determined to be generated in response to the number of times satisfying a frequency threshold.

17. The system of claim 15, wherein the substitution rule comprises a rule to substitute a first search query that includes: (i) the phrase that includes the first term, the second term, and the third term, and (ii) the additional term that is not included in the phrase,
- with a second search query that includes: (i) the phrase that includes the first term, the second term, and the third term, and (ii) the fourth term that is different than the additional term and that is not included in the phrase.

18. The system of claim 17, wherein the one or more computers are further configured to perform operations comprising:
- ranking the first search query and the second search query based at least on (i) a number of times the first search query is submitted to a search engine, and (ii) a number of times that the first search query is followed by the second search query in the collection of search queries.

19. The system of claim 15, wherein the additional term includes at least one of: (i) a substitute of at least one additional term of received terms other than the first term, the second term, and the third term, or (ii) an associate term associated with the collective meaning of the phrase that includes the first term, the second term, and the third term.

20. The system of claim 15, wherein determining the collective meaning of the phrase that includes the first term, the second term, and the third term comprises:
- determining whether the collective meaning of the phrase that includes the first term, the second term, and the third term matches a stored concept.

* * * * *